United States Patent
Wey et al.

(10) Patent No.: US 9,327,779 B1
(45) Date of Patent: May 3, 2016

(54) REMOVABLE FRONT SPOILER FOR A VEHICLE

(71) Applicant: Nissan North America, Inc., Franklin, TN (US)

(72) Inventors: Chiray Wey, Farmington Hills, MI (US); Alfredo Dimichele, Macomb, MI (US); Christopher Prisby, Farmington Hills, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 0 days.

(21) Appl. No.: 14/792,221

(22) Filed: Jul. 6, 2015

(51) Int. Cl.
*B62D 35/02* (2006.01)
*B62D 35/00* (2006.01)

(52) U.S. Cl.
CPC .............. *B62D 35/02* (2013.01); *B62D 35/005* (2013.01)

(58) Field of Classification Search
CPC .............................. B62D 35/02; B62D 35/005
USPC ...................................................... 296/180.1
See application file for complete search history.

(56) References Cited

U.S. PATENT DOCUMENTS

| | | | |
|---|---|---|---|
| 4,976,489 A * | 12/1990 | Lovelace | B62D 35/005 296/180.1 |
| 6,964,441 B2 | 11/2005 | Ariga et al. | |
| 7,222,894 B2 | 5/2007 | Suwa | |
| 8,292,350 B2 | 10/2012 | Li et al. | |
| 2013/0026783 A1* | 1/2013 | Kakiuchi | B62D 35/02 296/180.1 |

FOREIGN PATENT DOCUMENTS

| | | |
|---|---|---|
| JP | 3850813 B2 | 11/2006 |
| JP | 4281642 B2 | 6/2009 |

* cited by examiner

*Primary Examiner* — Joseph D Pape
(74) *Attorney, Agent, or Firm* — Global IP Counselors, LLP (57) ABSTRACT

A removable front spoiler for a vehicle includes a body member, a fastener and a clip. The body member has a shape configured to disrupt airflow, the body member including a horizontal mounting member extending in a car forward direction and being configured to mount directly to an underside of a vehicle body part, and a vertical wind deflection member adjacent the horizontal mounting member and being configured to face in a direction away from the vehicle body part. The horizontal mounting member includes an opening extending through the horizontal mounting member. The fastener is configured to extend in a vertical direction through the opening and into the vehicle body part. The clip is configured to couple to the fastener so as to couple the body member to the vehicle body part.

21 Claims, 6 Drawing Sheets

REMOVABLE FRONT SPOILER FOR A VEHICLE

BACKGROUND

1. Field of the Invention

The present invention generally relates to a removable front spoiler for a vehicle. More specifically, the present invention relates to a removable front spoiler for a vehicle having easily accessible attachments to the front fascia or front bumper shell of a vehicle.

2. Background Information

Conventional spoilers on the front of a vehicle direct air flow so as to reduce the amount of air flowing underneath the vehicle. Such air flow direction generally reduces aerodynamic lift and drag. However, generally in a 4×4 vehicle, truck or other vehicle type the spoiler extends in a downward direction from the front bumper area, which can reduce the approach angle.

SUMMARY

It has been discovered that to both reduce aerodynamic lift and drag (thus decrease fuel consumption) and to increase approach angle, it would be advantageous to include a removable front spoiler (chin spoiler) on a vehicle.

In view of the state of the known technology, one aspect of the present disclosure is to provide a removable front spoiler for a vehicle. The removable front spoiler includes a body member, a fastener and a clip. The body member has a shape configured to disrupt airflow, the body member including a horizontal mounting member extending in a car forward direction and being configured to mount directly to an underside of a vehicle body part, and a vertical wind deflection member adjacent the horizontal mounting member and being configured to face in a direction away from the vehicle body part. The horizontal mounting member includes an opening extending through the horizontal mounting member. The fastener is configured to extend in a vertical direction through the opening and into the vehicle body part. The clip is configured to couple to the fastener so as to couple the body member to the vehicle body part.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
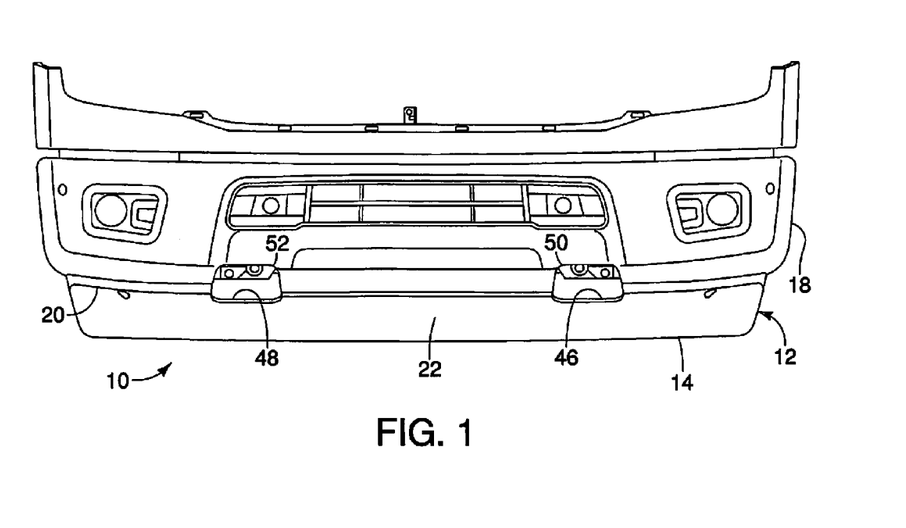
FIG. 1 is an elevational view of the front of a vehicle with a removable front spoiler according to one embodiment.

Referring initially to FIG. 1, a removable front spoiler 12 for a vehicle 10 is illustrated in accordance with a first embodiment. In this embodiment, the removable front spoiler 12 includes a body member 14, a plurality of connecting members 16 and a plurality of clips. The removable front spoiler 12 is attachable and detachable using the plurality of connecting members 16. In one embodiment, the removable front spoiler 12 is a chin spoiler 12 that is configured to couple to the underside of the front fascia or bumper shell 18 of a vehicle 10. The removable front spoiler 12 can be attached and detached to the vehicle 10 in a relatively simple manner to enable a user to attach the front spoiler 12 under normal driving conditions and detach the front spoiler 12 when a greater approach angle is desired. Thus, the removable front spoiler 12 illustrated in FIG. 1 is capable of enabling the vehicle 10 to reduce aerodynamic lift and drag (thus decrease fuel consumption) when attached to the vehicle 10, and to increase approach angle when not attached to the vehicle 10.

As shown in FIGS. 4-7, the body member 14 is preferably a plastic or molded member, and has a shape configured to disrupt airflow, including a horizontal mounting member 20 extending in a car forward direction and a vertical wind deflection member 22 adjacent the horizontal mounting member 20 extending in a generally downward direction. In one embodiment, the horizontal mounting member 20 and the vertical wind deflection member 22 are unitarily molded.

Figure 11:
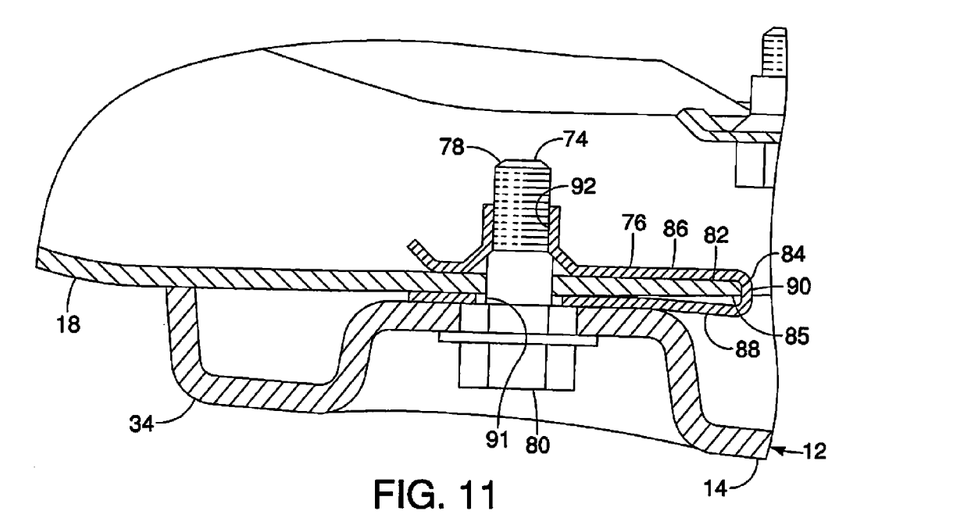
FIG. 11 is a side view in section of the connection between the removable front spoiler and the vehicle shown in FIG. 9.

The horizontal mounting member 20 is configured to mount directly to an underside of a vehicle body part (e.g., front fascia or bumper shell 18), and includes a plurality of openings 24 extending therethrough. The horizontal mounting member 20 can be arcuate so as to follow the contours of the front fascia or bumper shell 18 or other part of the vehicle 10 to which it is attached, but can have any suitable configuration. In one embodiment, the horizontal mounting member 20 includes eight openings 24, but can have as many or as few openings 24 as desired. The openings 24 are generally circular, and extend from an underside 26 of the horizontal mounting member 20 to an upper side 28 of the horizontal mounting member 20, and extend in a direction that is generally transverse to the surface 30 at the upper side 28 and the surface 32 at the underside 26. The openings 24 can be disposed on an embossed portion 34 of the body member 14. That is, as shown in FIG. 11, the embossed portion 34 can be a protrusion or raised area in the horizontal mounting member 20. The horizontal mounting member 20 can have an upwardly extending lip 36 on a car forward surface 38 to improve fit and finish aesthetics or for any other suitable reason.

The body member 14 includes a locating pin 40 disposed adjacent the opening 26 in the horizontal mounting member 20. The locating pin 40 facilitates proper positioning of the body member 14 relative to the body member 14. That is, the locating pin 40 is preferably a cylindrical projection extending upward from the surface 30 at the upper side 28. Thus, the locating pin 40 can extend upwardly and through an opening 42 in the body part of the vehicle 10, enabling proper alignment and positioning of the body member 14. The locating pin 40 can be injection molded with the body member 14, if desired.

In one embodiment, the locating pin 40 is also disposed on the embossed portion 34 of the body member 14. The body member 14 generally includes three locating pins 40, a first locating pin generally in the central area 44 of the body member 14, a second locating pin disposed on one side 46 of the body member 14 and a third locating pin disposed on the other (opposite) side 48 of the body member 14. It is noted, however, that the body member 14 can have as few or as many locating pins 40, as desired, and disposed in any positions. The locating pins 40 can be unitarily formed during a molding process or be formed with or connected to the body member 14 in any suitable manner.

Figure 2:
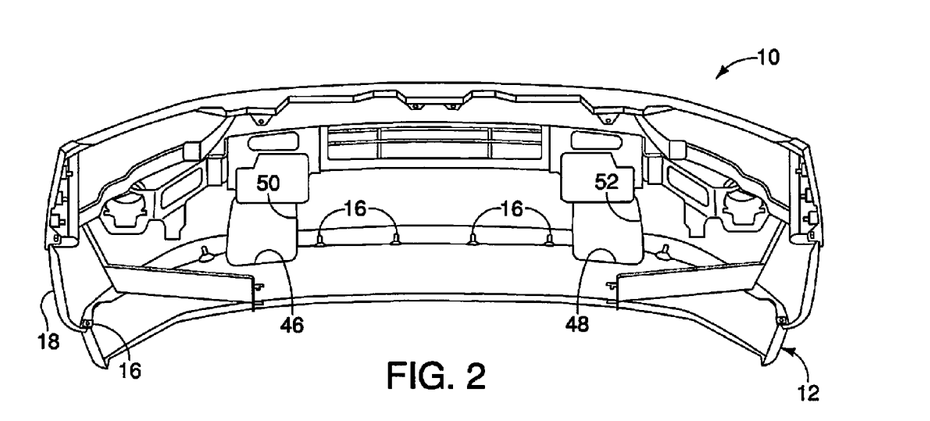
FIG. 2 is an elevational view of the front of the vehicle with the removable front spoiler illustrated in FIG. 1 from the rearward direction.
Figure 4:
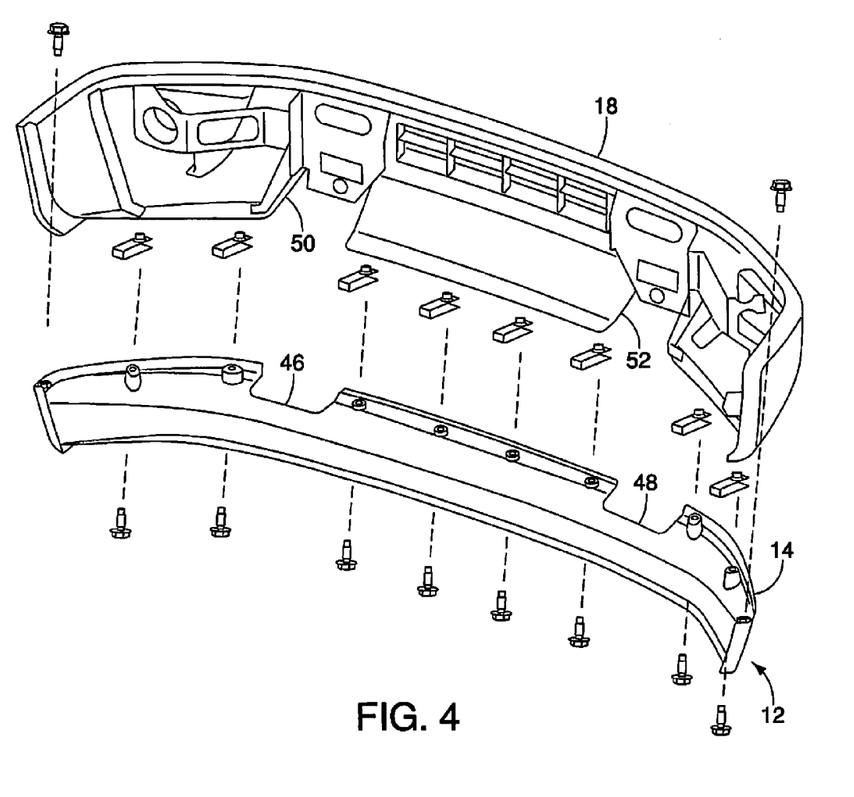
FIG. 4 is an exploded perspective view of the front of the vehicle with the removable front spoiler illustrated in FIG. 1.
Figure 5:
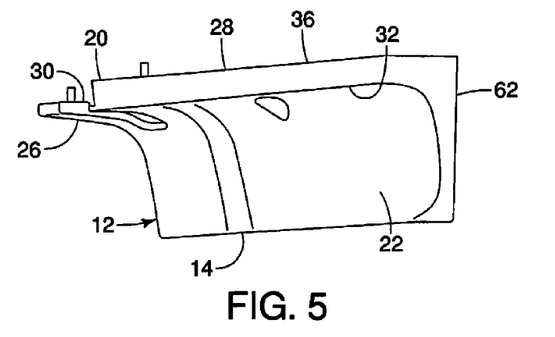
FIG. 5 is a side view of the removable front spoiler illustrated in FIG. 1.

As illustrated in FIGS. 2 and 4, the horizontal mounting member 20 can include a first recessed or removed portion 46 and second recessed or removed portion 48. These portions 46 and 48 align with a first opening 50 and a second opening 52, respectively in the vehicle body part (e.g., front fascia or bumper shell 18). Thus, as shown in FIG. 2, once aligned, the first and second recessed portions 46 and 48 and the first and second openings 50 and 52 form openings that enable access to a structure connected to the vehicle 10, for example, tow hooks.

The vertical wind deflection member 22 extends at approximately 90° from the horizontal mounting member 20, but can extend at any suitable angle. The vertical wind deflection member 22 generally deflects wind, such that aerodynamic lift and drag on the vehicle 10 is reduced. This reduction in aerodynamic lift and drag can decrease fuel consumption. The vertical wind deflection member 22 can be arcuate so as to follow the contours of the front fascia or bumper shell 18 or other part of the vehicle 10 to which it is attached, but can have any suitable configuration. The vertical wind deflection member 22 includes a first surface 54 and a second surface. The first surface 54 faces in a vehicle rear direction while the second surface faces in a vehicle forward direction. As shown in FIG. 4, the vertical wind deflection member 22 can include a lip 58 that extends along the bottom edge 60 and along the rear edge 62. Further, a flange 64 extends generally perpendicular to the vertical wind deflection member 22 and generally parallel to the horizontal mounting member 20 and has an opening 66 therethrough.

Figure 3:
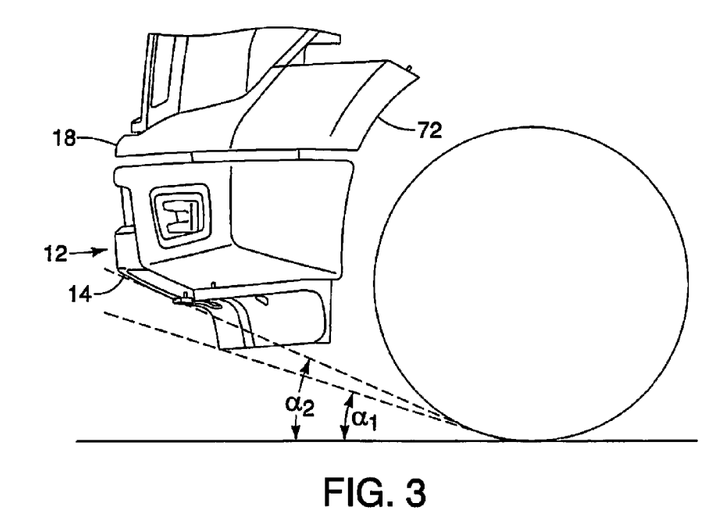
FIG. 3 is a side elevational view of the front of the vehicle with the removable front spoiler illustrated in FIG. 1.
Figure 6:
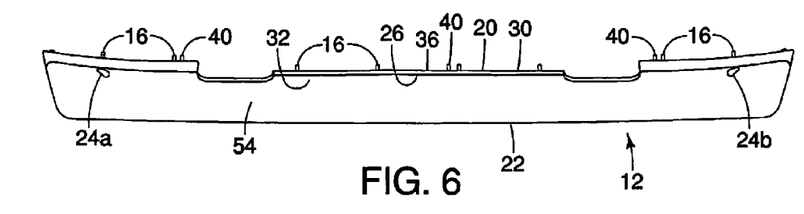
FIG. 6 is a front view of the removable front spoiler illustrated in FIG. 1.
Figure 7:
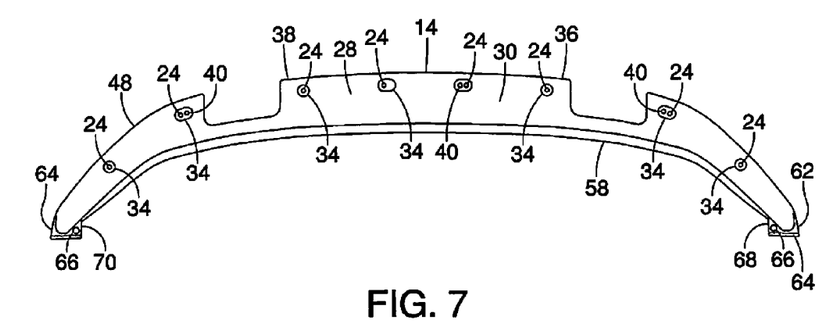
FIG. 7 is a bottom view of the removable front spoiler illustrated in FIG. 1.
Figure 8:
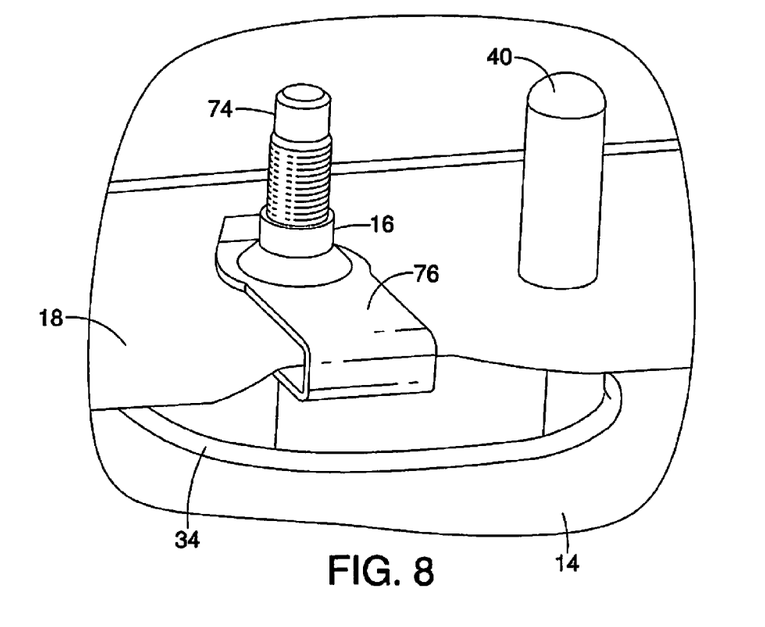
FIG. 8 is an enlarged view of the removable front spoiler illustrated in FIG. 2, illustrating the connection between the removable front spoiler and the vehicle, including the locating pin.
Figure 9:
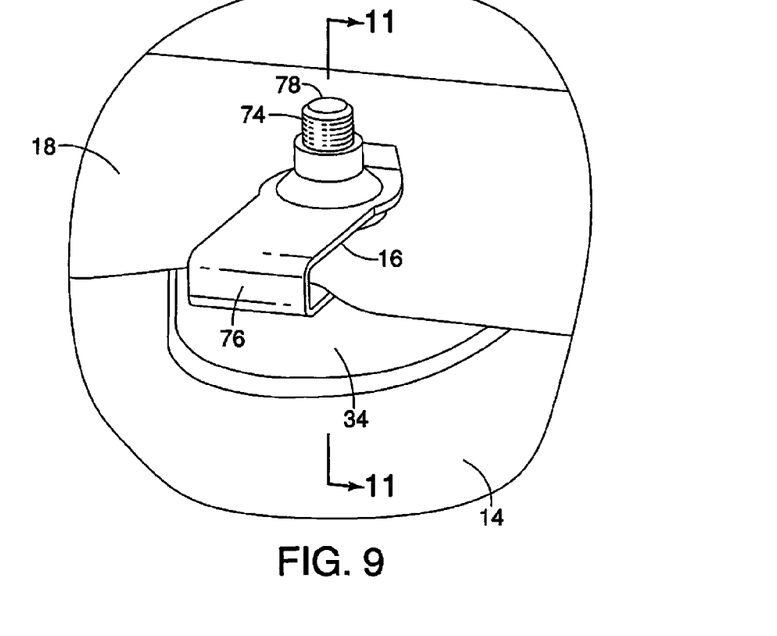
FIG. 9 is an enlarged perspective view of the removable front spoiler illustrated in FIG. 2, illustrating the connection between the removable front spoiler and the vehicle.

Moreover, access to the fasteners can at least partially be provided through the vertical wind deflection member 22. For example, as shown in FIG. 6, the outer openings 24a and 24b on the body member 14 enable partial access through the vertical wind deflection member 22. As shown in FIG. 3, the vertical wind deflection member 22 includes openings 66 at the ends 68 and 70 therethrough to enable additional connecting members 16 to extend through therethrough from the wheel well 72 of the vehicle 10.

Figure 12:
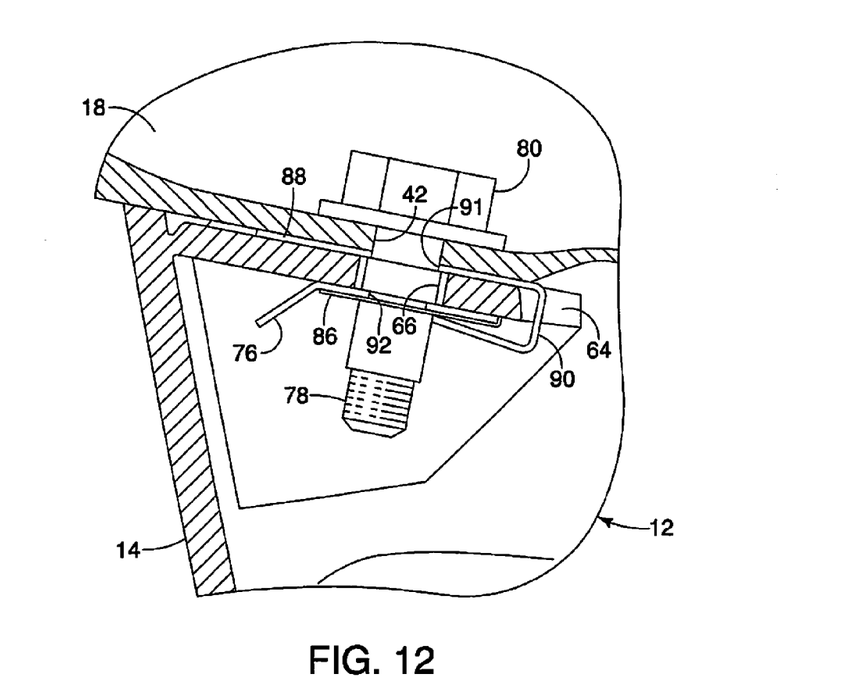
FIG. 12 is a side view in section of the connection between the removable front spoiler and the vehicle shown in FIG. 10.

As shown in FIGS. 8-12, the connecting members 16 include a fastener 74 and a retainer or clip 76. Accordingly, in one embodiment, fastener 74 is one of a plurality of fasteners and retainer 76 is one of a plurality of retainers 76. The fastener 74 is configured to extend in a vertical direction through the opening in the body member 14. As shown in FIG. 11, the fastener 74 extends upwardly through the body member 14 and into the vehicle body part (e.g., the front fascia or bumper shell 18). However, as shown in FIG. 12, the fastener 74 extends downwardly through the vehicle body part (e.g., wheel well) and into the body member 14. That is, when assembled, several of the fasteners 74 are inserted from below the vehicle 10, through the opening in the body member 14 and into the opening 42 in the vehicle body part (e.g., the front fascia or bumper shell 18), while at least two fasteners 74 are inserted from above, through the opening 42 in the vehicle body part (e.g., wheel well) and into the opening 24 in the body member 14. The fasteners 74 can be any suitable fastener, but in one embodiment, each of the fasteners 74 has a stem portion 78 and a head portion 80.

The retainer 76 is preferably a J-clip that is disposed so as to extend on the first side 82 of the vehicle body part (e.g., front fascia or bumper shell 18) and around the edge 84 of the vehicle body part (e.g., the front fascia or bumper shell 18) and along the second side 85 of the vehicle body part (e.g., the front fascia or bumper shell 18), as shown in FIGS. 11 and 12. Thus, the retainer 76 is configured to be disposed on two sides of the vehicle body part (e.g., the front fascia or bumper shell 18). In another embodiment the J-clip can be disposed so as to extend on the first side 82 of the vehicle body part (e.g., the front fascia or bumper shell 18) and around the edge 84 of the vehicle body part (e.g., the front fascia or bumper shell 18) and the body member 14 to the surface 32 at the underside 26 of the horizontal mounting member 20 of the body member 14. Thus, the J-clip has a first arm portion 86, a second arm portion 88 and a connecting portion 90, connecting the first arm portion 86 to the second arm portion 88. The fastener 74 extends through an opening 91 in the second arm portion 88 and into an opening 92 in the first arm portion 86. Accordingly, the fastener 74 extends in an upward direction and the head portion 80 is accessible from underneath the front fascia or bumper shell 18 or other part of the vehicle 10.

Figure 10:
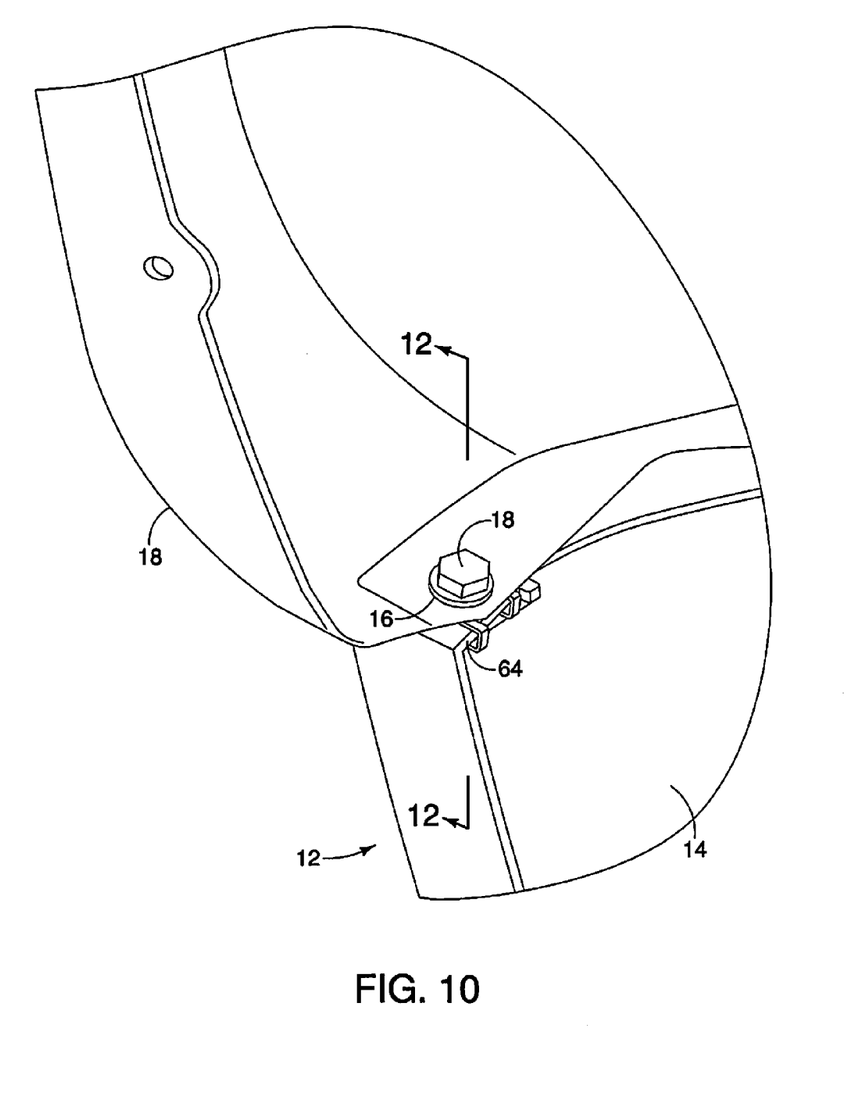
FIG. 10 an enlarged perspective view of the removable front spoiler illustrated in FIG. 2, illustrating the connection between the removable front spoiler and the vehicle in the wheel well.

As shown in FIGS. 10 and 12, at the ends 68 and 70 of the body member 14, the fastener 74 extends through an opening 42 in the vehicle body part, for example, the vehicle front fascia or bumper shell 18 or the wheel well 72 and through the opening 24 in the flange 64. Thus, the fastener 74 at the ends 68 and 70 of the body member 14 work in the same manner, but are inserted in the opposite direction of the other fasteners. Thus, one (i.e., a first) fastener is configured to extend in a first direction and another (i.e., a second) fastener is configured to extend in a second direction, the first direction being opposite the second direction. Accordingly, the first fastener is configured to be disposed so as to be accessible from an underside of the vehicle 10 and the second fastener is configured to be disposed so as to be accessible from a wheel well 72 of the vehicle 10.

In operation, as shown in FIGS. 1-3, 10 and 11, the locating pins 40 are inserted into the openings 42 of the vehicle body part (e.g., the front fascia or bumper shell 18 or wheel well 72) to properly align and position the body member 14. The retainers 76 are then positioned such that the openings 92 and 91 in the first and second arms 86 and 88 are aligned with the opening 42 in the vehicle body part and the opening 24 in the body member 14. The fastener 74 can then be inserted into the openings 24 and 42 to secure the body member 14 to the vehicle body part. The fastener 74 can be threaded into the retainer 76 or inserted and retained in any suitable manner. This procedure is repeated for each connecting member 16 until the body member 14 is fully secure to the vehicle body part. In this configuration the spoiler 12 reduces aerodynamic lift and drag (thus decreasing fuel consumption).

However, as can be understood such a configuration can decrease the approach angle. For example, as shown in FIG. 3, in one embodiment, the approach angle $\alpha_1$ with the spoiler 12 attached is about 16°. Accordingly, in certain situations, it may be advantageous to increase the approach angle. For example, in off roading situations the driver of the vehicle 10 may desire a larger approach angle. In this situation, the driver can remove the spoiler 12 by simply removing the fasteners 74. Once all fasteners 74 are removed, and the spoiler 12 is removed, the approach angle $\alpha_1$ can be increased to about or approximately 20.5°-21.5°. In this situation, the vehicle 10 is more suited to off road situations or other situations in which a large approach angle is desired.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the removable front spoiler. Accordingly, these terms, as utilized to describe the present invention should be interpreted relative to a vehicle equipped with the removable front spoiler.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A removable front spoiler for a vehicle, comprising:
    a body member having a shape configured to disrupt airflow, the body member including a horizontal mounting member configured to mount directly to an underside of a vehicle body part, and a vertical wind deflection member adjacent the horizontal mounting member and being configured to face in a direction away from the vehicle body part, the horizontal mounting member including an opening extending through the horizontal mounting member;
    a fastener configured to extend in a vertical direction through the opening and into the vehicle body part; and
    a clip configured to couple to the fastener so as to couple the body member to the vehicle body part,
    the horizontal mounting member extending from the vertical wind deflection member in a car forward direction.

2. The removable front spoiler according to claim 1, wherein
    the opening is one of a plurality of openings and the fastener is one of a plurality of fasteners.

3. The removable front spoiler according to claim 1, wherein
    the body member includes a locating pin disposed adjacent the opening and being configured to extend through an opening in the vehicle body part.

4. The removable front spoiler according to claim 3, wherein
    the opening and the locating pin are configured to be disposed on an embossed portion of the body member.

5. The removable front spoiler according to claim 3, wherein
    the locating pin is injection molded.

6. The removable front spoiler according to claim 3, wherein
    the locating pin is one of a plurality of locating pins.

7. The removable front spoiler according to claim 1, wherein
    the body member includes recesses configured to enable tow hooks to be accessible therethrough.

8. The removable front spoiler according to claim 1, wherein
    the clip is a J-clip and is configured to couple the body member to a front bumper shell of the vehicle.

9. The removable front spoiler according to claim 1, wherein
    the J-clip is configured to be disposed on two sides of the bumper shell.

10. The removable front spoiler according to claim 1, wherein
    the body member is configured to enable an approach angle of about 16°.

11. The removable front spoiler according to claim 1, wherein
    the clip is configured to be removable such that the body member can be detached from the vehicle body part.

12. The removable front spoiler according to claim 1, wherein
    the opening is a first opening of a plurality of openings and the fastener is a first fastener of a plurality of fasteners, and a second fastener of the plurality of fasteners is configured to extend through the vehicle body part and into a second opening of the plurality of openings.

13. The removable front spoiler according to claim 12, wherein
the first fastener is configured to be disposed so as to be accessible from an underside of the vehicle and the second fastener is configured to be disposed so as to be accessible from a wheel well of the vehicle.

14. The removable front spoiler according to claim 12, wherein
the first fastener is configured to extend in a first direction and the second fastener is configured to extend in a second direction, the first direction being opposite the second direction.

15. The removable front spoiler according to claim 14, wherein
the body member has a flange disposed on a rear end thereof, and
the second fastener is configured to extend through the flange.

16. The removable front spoiler according to claim 1, wherein
the opening is configured to be disposed on an embossed portion of the body member.

17. A removable front spoiler for a vehicle, comprising:
a body member having a shape configured to disrupt airflow, the body member including a horizontal mounting member extending in a car forward direction and being configured to mount directly to an underside of a vehicle body part, and a vertical wind deflection member adjacent the horizontal mounting member and being configured to face in a direction away from the vehicle body part, the horizontal mounting member including an opening extending through the horizontal mounting member;
a fastener configured to extend in a vertical direction through the opening and into the vehicle body part; and
a clip configured to couple to the fastener so as to couple the body member to the vehicle body part,
the body member including a locating pin disposed adjacent the opening and being configured to extend through an opening in the vehicle body part.

18. The removable front spoiler according to claim 3, wherein
the opening and the locating pin are configured to be disposed on an embossed portion of the body member.

19. The removable front spoiler according to claim 3, wherein
the locating pin is injection molded.

20. The removable front spoiler according to claim 3, wherein
the locating pin is one of a plurality of locating pins.

21. A removable front spoiler for a vehicle, comprising:
a body member having a shape configured to disrupt airflow, the body member including a horizontal mounting member extending in a car forward direction and being configured to mount directly to an underside of a vehicle body part, and a vertical wind deflection member adjacent the horizontal mounting member and being configured to face in a direction away from the vehicle body part, the horizontal mounting member including an opening extending through the horizontal mounting member;
a fastener configured to extend in a vertical direction through the opening and into the vehicle body part; and
a clip configured to couple to the fastener so as to couple the body member to the vehicle body part.
the clip configured to extend along a first side of the vehicle body part and around an edge of at least one of the vehicle body part and the body member.

* * * * *